US010862422B2

United States Patent
Tao et al.

(10) Patent No.: US 10,862,422 B2
(45) Date of Patent: Dec. 8, 2020

(54) WIRE CONNECTION TERMINAL FOR PHOTOVOLTAIC STRING

(71) Applicant: SUNGROW POWER SUPPLY CO., LTD., Hefei Anhui (CN)

(72) Inventors: Lei Tao, Hefei Anhui (CN); Nianan Pan, Hefei Anhui (CN); Zhiqiang Han, Hefei Anhui (CN); Ai Wang, Hefei Anhui (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 355 days.

(21) Appl. No.: 15/906,340

(22) Filed: Feb. 27, 2018

(65) Prior Publication Data

US 2018/0287556 A1    Oct. 4, 2018

(30) Foreign Application Priority Data

Mar. 31, 2017    (CN) .......................... 2017 1 0209534

(51) Int. Cl.
*H02S 40/36* (2014.01)
*H02S 40/34* (2014.01)
(Continued)

(52) U.S. Cl.
CPC ........... *H02S 40/36* (2014.12); *H02H 1/0007* (2013.01); *H02H 1/0092* (2013.01); *H02H 3/04* (2013.01);
(Continued)

(58) Field of Classification Search
CPC .......... H02S 40/36; H02S 40/30; H02S 40/34; H02H 1/0007
See application file for complete search history.

(56) References Cited

U.S. PATENT DOCUMENTS

2009/0207543 A1\* 8/2009 Boniface ................. H02H 3/16
361/86
2010/0139733 A1    6/2010 Jonczyk et al.
(Continued)

FOREIGN PATENT DOCUMENTS

CN    101997241 A    3/2011
CN    103715983 A    4/2014
(Continued)

OTHER PUBLICATIONS

SIPO First Office Action corresponding to Application No. 201710209534.9; dated Apr. 20, 2018.

*Primary Examiner* — Scott Bauer
(74) *Attorney, Agent, or Firm* — Cantor COlburn LLP (57) ABSTRACT

A wire connection terminal for a photovoltaic string is provided. The wire connection terminal includes: a terminal connector, a fuse and a printed circuit board (PCB). The terminal connector is connected to a positive electrode or a negative electrode of the photovoltaic string. The fuse is configured to prevent the photovoltaic string from outputting an excessive current. The PCB is configured to sample an output current and an output voltage of the photovoltaic string, communicate with an inverter, and control the photovoltaic string to disconnect from a direct current bus and output abnormal data for display when the output current and/or the output voltage of the photovoltaic string is abnormal or a system failure occurs.

8 Claims, 6 Drawing Sheets (51) Int. Cl.
    *H02S 50/00*     (2014.01)
    *H02H 1/00*     (2006.01)
    *H02H 7/20*     (2006.01)
    *H02S 40/30*     (2014.01)
    *H02H 3/04*     (2006.01)
    *H02H 3/087*     (2006.01)
    *H02H 3/20*     (2006.01)
    *H02S 40/32*     (2014.01)

(52) U.S. Cl.
    CPC ............ *H02H 3/087* (2013.01); *H02H 3/202* (2013.01); *H02H 3/207* (2013.01); *H02H 7/20* (2013.01); *H02S 40/30* (2014.12); *H02S 40/34* (2014.12); *H02S 50/00* (2013.01); *H02S 40/32* (2014.12)

(56) References Cited

U.S. PATENT DOCUMENTS

2016/0011246 A1\*   1/2016   Fischer .............. G01R 19/2513
                                                                       324/126
2016/0190798 A1\*   6/2016   Narla .................... H02H 7/122
                                                                        307/80

FOREIGN PATENT DOCUMENTS

CN         204761391 U     11/2015
CN         205986768 U     2/2017

\* cited by examiner

WIRE CONNECTION TERMINAL FOR PHOTOVOLTAIC STRING

CROSS REFERENCE TO RELATED APPLICATION

The present application claims priority under 35 U.S.C. § 119 to Chinese Application No. 201710209534.9 filed Mar. 31, 2017, the entire content of which is incorporated herein by reference.

FIELD

The present disclosure relates to the technical field of photovoltaic power generation, and in particular to a wire connection terminal for a photovoltaic string.

BACKGROUND

The conventional large-scale ground photovoltaic power station generally includes a photovoltaic string (which is formed by multiple photovoltaic modules connected in series), a combiner box, a centralized inverter, a transformer and the like. The combiner box is configured to collect output positive and negative cables of the photovoltaic string together so as to be connected to the inverter. Moreover, the combiner box has a fuse inside to protect the photovoltaic string from over-current. Some combiner boxes have a function such as current detection.

Figure 1:
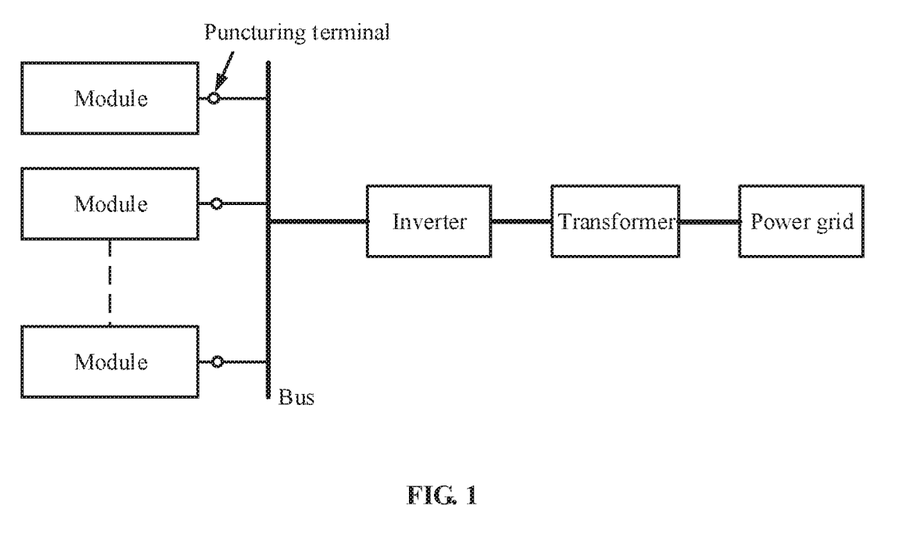

With the continuous development of the photovoltaic industry technology and increasing competition in the photovoltaic industry, more and more new technologies and new solutions are applied to the photovoltaic industry. One solution introduced to the photovoltaic industry recently is to replace the combiner box with an insulating puncturing terminal. Referring to FIG. 1, in the solution, a puncturing terminal and a wire form a direct current bus, the output of each photovoltaic string is connected to the puncturing terminal and then connected to the direct current (DC) bus, and the DC bus is connected to the inverter via a cable. Each puncturing terminal is provided with a fuse device for protecting the circuit when the current is excessive. With the solution, the combiner box may be replaced, thereby greatly saving an investment cost.

However, in a case that the converging is performed by using the solution, an actual state cannot be monitored although the cost of the combiner box can be saved. In a case that the puncturing terminal falls off, fails, or a voltage and current failure occurs in the photovoltaic string, the fault location can only be achieved by troubleshooting, thereby resulting in a large amount of maintenance work and a safety risk.

SUMMARY

A wire connection terminal for a photovoltaic string is provided according to the present disclosure, to solve the problem of a large amount of maintenance work and a safety risk in the conventional technology.

To achieve the above object, a technical solution according to the present application is as follows.

A wire connection terminal for a photovoltaic string is provided, where the wire connection terminal is arranged between a photovoltaic string and a direct current (DC) bus, the photovoltaic string includes at least one photovoltaic module, and the wire connection terminal for the photovoltaic string includes:

a terminal connector configured to connect to a positive electrode or a negative electrode of the photovoltaic string:

a fuse configured to connect the wire connection terminal to the DC bus and prevent the photovoltaic string from outputting an excessive current; and a printed circuit board (PCB) configured to sample an output current and an output voltage of the photovoltaic string, communicate with an inverter, and control the photovoltaic string to disconnect from the DC bus and output abnormal data for display when the output current and/or the output voltage of the photovoltaic string is abnormal or a system failure occurs.

Preferably, the PCB may include:

a current sampling circuit configured to sample the output current of the photovoltaic string;

a voltage sampling circuit configured to sample the output voltage of the photovoltaic string; and a communication circuit configured to communicate with the inverter.

Preferably, the terminal connector may be further configured to connect different electrodes of two photovoltaic modules so that the two photovoltaic modules are connected in series.

Preferably, the PCB may include a processor.

Preferably, the PCB may further include a power circuit configured to supply power for the current sampling circuit, the voltage sampling circuit and the communication circuit.

Preferably, the communication circuit may be configured to communicate with the inverter via RS485, Programmable Logic Controller (PLC), Controller Area Network (CAN) or Wireless Fidelity (WiFi).

Preferably, the communication circuit may be configured to communicate with the inverter directly or communicate with the inverter via a data collector.

Preferably, the communication circuit may be configured to communicate with the inverter via the data collector and communicate with a monitoring platform via the data collector simultaneously.

With the wire connection terminal for the photovoltaic string according to the present disclosure, the terminal connector is configured to connect to a positive electrode or a negative electrode of the photovoltaic string; the fuse is configured to connect the wire connection terminal and the direct current bus and prevent the photovoltaic string from outputting an excessive current; and the PCB is configured to sample the output current and the output voltage of the photovoltaic string, communicate with an inverter, and control the photovoltaic string to disconnect from the direct current bus and output abnormal data for display when the output current and/or the output voltage of the photovoltaic string is abnormal or a system failure occurs. In this way, it is solved the problem in the conventional technology that there is a large amount of maintenance work and a safety risk due to troubleshooting to achieve fault location in a case that the puncturing terminal falls off or is short-circuited or the like.

BRIEF DESCRIPTION OF THE DRAWINGS

In order to illustrate technical solutions in the embodiments of the present disclosure or in the conventional technology more clearly, drawings to be used in the description of the embodiments or the conventional technology are introduced briefly hereinafter. Apparently, the drawings described hereinafter merely illustrate some embodiments of the present disclosure, and other drawings may be obtained by those skilled in the art based on these drawings without any creative efforts.

FIG. 1 is a schematic diagram showing connection of a puncturing terminal according to the conventional technology.

DETAILED DESCRIPTION OF THE EMBODIMENTS

The technical solutions according to the embodiments of the present application will be described clearly and completely as follows in conjunction with the drawings in the embodiments of the present application. It is apparent that the described embodiments are only a part rather than all of the embodiments according to the present application. Any other embodiments obtained by those skilled in the art based on the embodiments in the present application without any creative efforts fall within the protection scope of the present application.

A wire connection terminal for a photovoltaic string is provided according to the present disclosure, to solve the problem of a large amount of maintenance work and a safety risk in the conventional technology.

Figure 2:
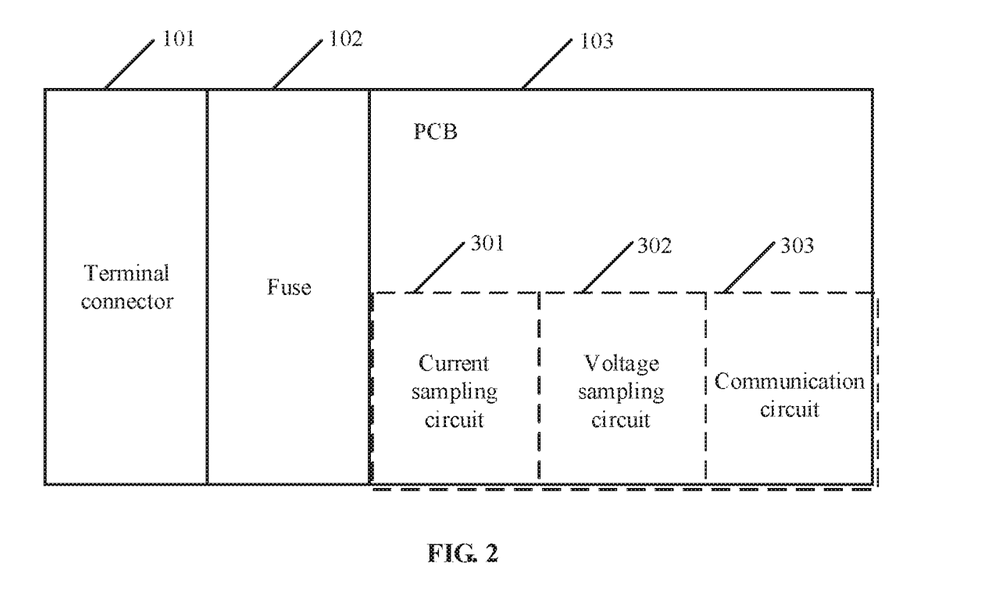
FIG. 2 is a schematic structural diagram of a wire connection terminal for a photovoltaic string according to an embodiment of the present disclosure.

Referring to FIG. 2, the wire connection terminal for the photovoltaic string is arranged between a photovoltaic string and a DC bus. The photovoltaic string includes at least one photovoltaic module. The wire connection terminal for the photovoltaic string includes: a terminal connector 101, a fuse 102, and a Printed Circuit Board (PCB) 103. The PCB includes a current sampling circuit 301, a voltage sampling circuit 302 and a communication circuit 303.

Specifically the terminal connector 101 is configured to connect to a positive electrode or a negative electrode of the photovoltaic string.

The fuse 102 is configured to connect the wire connection terminal 101 to the DC bus and prevent the photovoltaic string from outputting an excessive current.

The PCB 103 is configured to sample an output current and an output voltage of the photovoltaic string, communicate with an inverter, and control the photovoltaic string to disconnect from the DC bus and output abnormal data for display when the output current and/or the output voltage of the photovoltaic string is abnormal or a system failure occurs.

Figure 3:
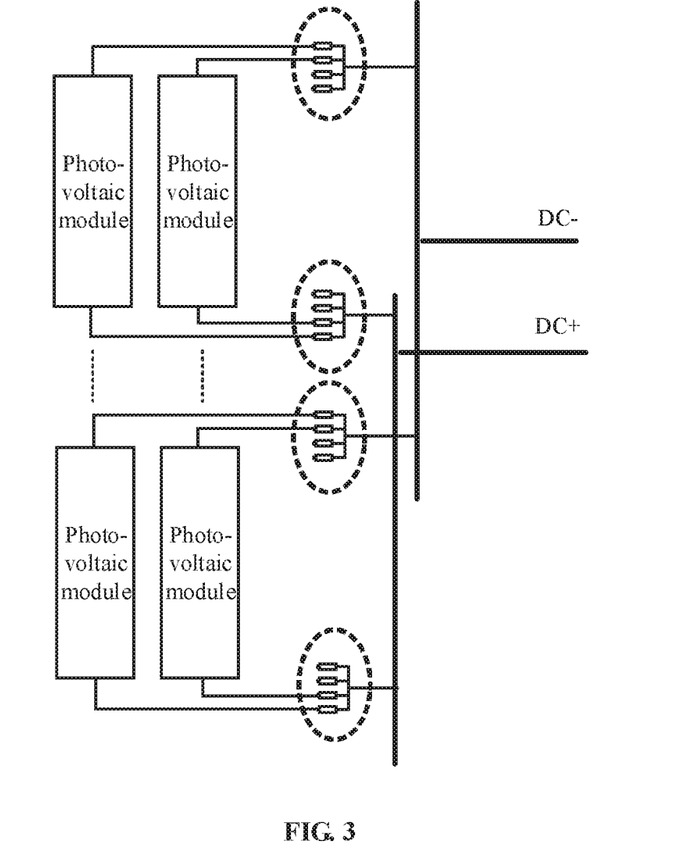
FIG. 3 is a schematic diagram showing an application of a wire connection terminal for a photovoltaic string according to another embodiment of the present disclosure.

In a specific application, a connection relationship between the wire connection terminal for the photovoltaic string and the photovoltaic string may be seen in FIG. 3. A positive electrode of each photovoltaic string is connected to a positive electrode direct current bus DC+ via one wire connection terminal for a photovoltaic string, and a negative electrode of the photovoltaic string is connected to a negative electrode direct current bus DC-via one wire connection terminal for a photovoltaic string. In this way, multiple photovoltaic strings are connected in parallel to connect to the inverter via a corresponding number of wire connection terminals for a photovoltaic string.

Preferably, referring to FIG. 2, the PCB 103 may include: a current sampling circuit 301, a voltage sampling circuit 302 and a communication circuit 303.

The current sampling circuit 301 is configured to sample an output current of the photovoltaic string.

The voltage sampling circuit 302 is configured to sample an output voltage of the photovoltaic string.

The communication circuit 303 is configured to communicate with the inverter.

In a case that an output of the photovoltaic string is connected to the direct current bus via a wire connection terminal for a photovoltaic string, the wire connection terminal for the photovoltaic string samples the output current of the photovoltaic string by the current sampling circuit 301, samples the output voltage of the photovoltaic string by the voltage sampling circuit 302, and then transmits the collected information to a processor that needs to acquire a state of each photovoltaic string by the communication circuit 303. For example, the collected information may be transmitted to a processor of the inverter, as shown by a dotted line in FIG. 4. The inverter analyzes the received information on the photovoltaic string based on the actual needs, for example, determining whether there is a fault or exception in the photovoltaic string, and determining values of a voltage and a current in the photovoltaic string. The information is transmitted or displayed to a monitoring interface as required to facilitate an operation and maintenance of a power station.

The communication circuit 303 may perform communication via RS485, PLC, CAN, wifi, and the like, which is not limited herein. The communication mode may be determined according to a specific application environment, and all the communication modes fall within the scope of protection of the present application.

Upon detecting a fault in the photovoltaic string, the PCB 103 can control to disconnect the output of the photovoltaic string from the system. Moreover, when there is a fault in the entire system, the fault information can be transmitted to the wire connection terminal for the photovoltaic string by the above communication, thereby controlling to disconnect the output of the connected photovoltaic string.

Preferably, the PCB 103 arranged inside the wire connection terminal for the photovoltaic string may further include a processor according to the actual usage.

The fuse 102 may protect the circuit when the input current is excessive.

In addition, preferably, the PCB 103 may further include a power circuit configured to supply power for the current sampling circuit 301, the voltage sampling circuit 302 and the communication circuit 303. The power circuit can take the direct current nearby.

With the wire connection terminal for the photovoltaic string according to the embodiment, the output current and the output voltage of the corresponding photovoltaic string are sampled by the corresponding sampling circuit, and the wire connection terminal for the photovoltaic string communicates with an inverter via the communication circuit 303; and the PCB 103 is configured to control the photovoltaic string to disconnect from the direct current bus and output abnormal data for display when the output current and/or the output voltage of the photovoltaic string is abnormal or a system failure occurs. In this way, it is solved the problem in the conventional technology that there is a large amount of maintenance work and a safety risk due to troubleshooting to achieve fault location in a case that the puncturing terminal falls off or is short-circuited.

Figure 4:
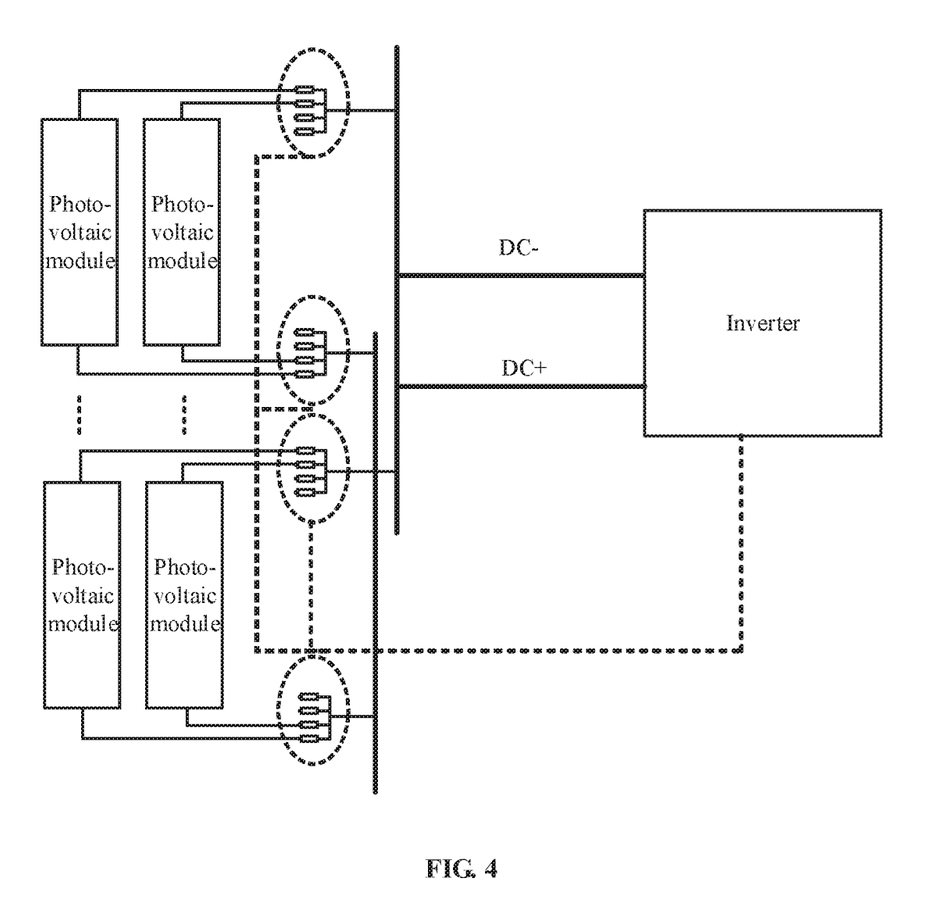
FIG. 4 is a schematic diagram showing an application of a wire connection terminal for a photovoltaic string according to another embodiment of the present disclosure.
Figure 5:
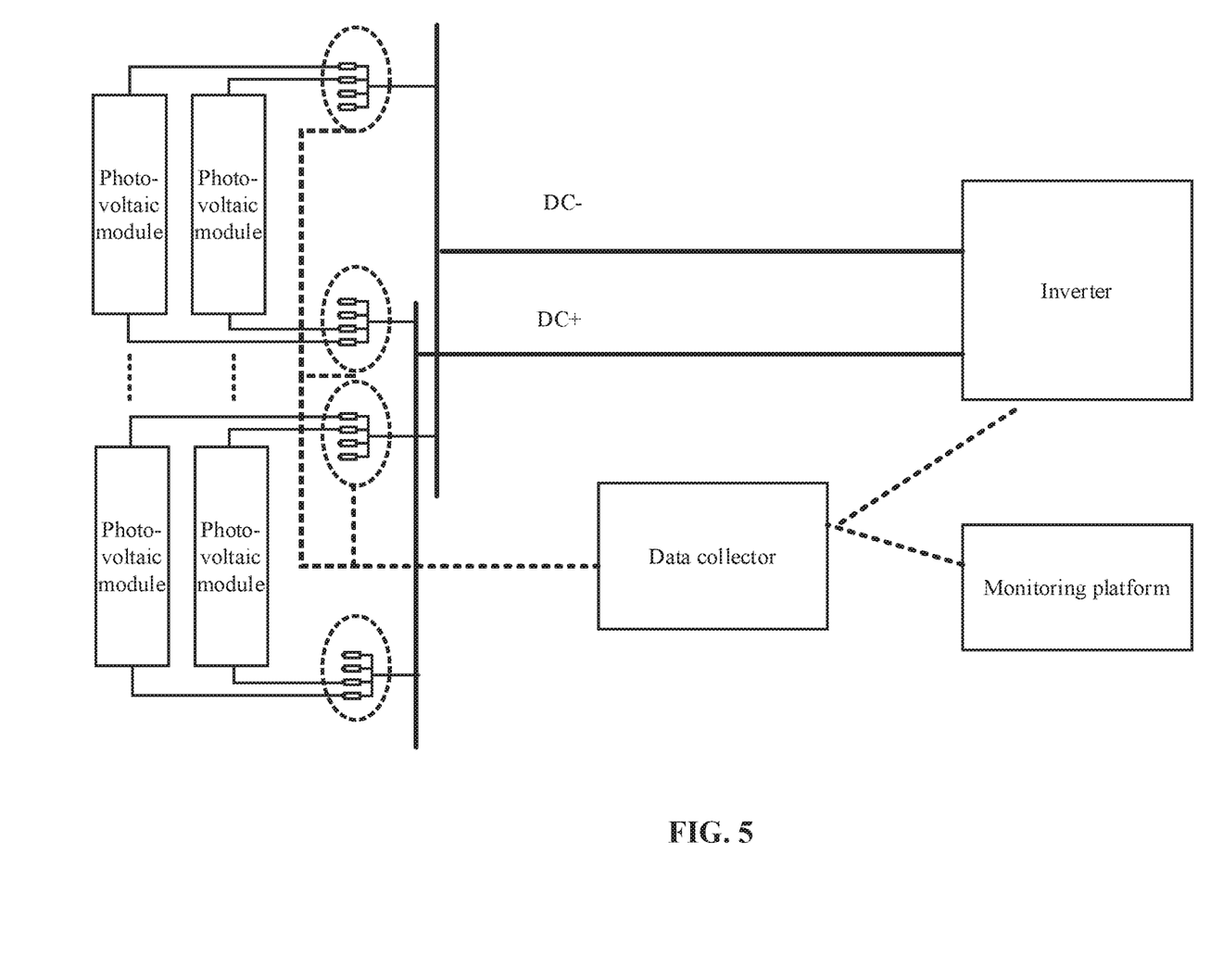
FIG. 5 is a schematic diagram showing an application of a wire connection terminal for a photovoltaic string according to another embodiment of the present disclosure.

It should be noted that, the communication circuit 303 is configured to directly communicate with the inverter (as shown in FIG. 4), or communicate with the inverter via a data collector (as shown in FIG. 5).

As shown in FIG. 5, preferably, the communication circuit 303 may be configured to communicate with the inverter via the data collector and communicate with a monitoring platform via the data collector simultaneously.

When the output of the photovoltaic string is connected to the direct current bus via a wire connection terminal for a photovoltaic string, the wire connection terminal for the photovoltaic string samples an output current of the photovoltaic string by the current sampling circuit 301, samples an output voltage of the photovoltaic string by the voltage sampling circuit 302, and then the communication circuit 303 transmits the collected information to an inverter and a monitoring platform via the data collector, as shown by the dotted line in FIG. 5. The inverter or the monitoring platform analyzes the received information on the photovoltaic string based on the actual needs, for example, determining whether there is a fault or exception in the photovoltaic string, and determining values of a voltage and a current in the photovoltaic string. The information is transmitted or displayed to a monitoring interface as required to facilitate the operation and maintenance of the power station.

Figure 6:
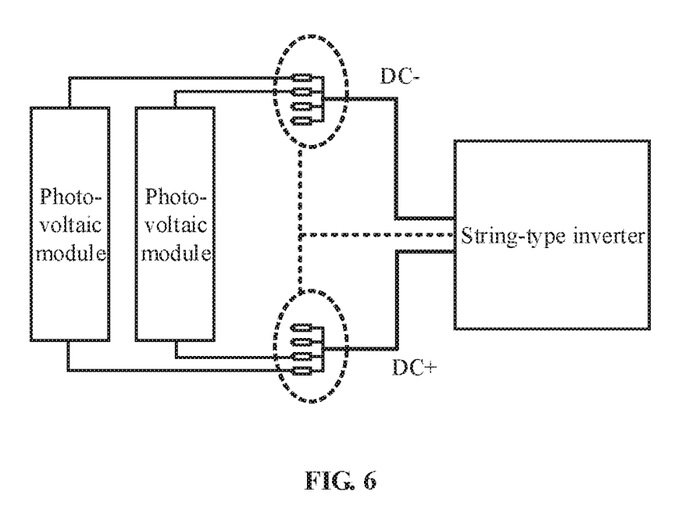
FIG. 6 is a schematic diagram showing an application of a wire connection terminal for a photovoltaic string according to another embodiment of the present disclosure.

FIG. 4 and FIG. 5 are connection schematic diagrams showing a case that a wire connection terminal for the photovoltaic string is applied to a centralized inverter power station, and FIG. 6 is a connection schematic diagram showing a case that the wire connection terminal for the photovoltaic string is applied to a string-type inverter power station, where the communication connection is indicated by the dotted line in the figures. The specific functions of the wire connection terminal are the same as those in the foregoing embodiments, which are not described herein.

Another wire connection terminal for the photovoltaic string is further provided according to another embodiment of the present disclosure, which is applied to a roof power station. Based on the above embodiment and FIG. 2, the terminal connector 101 is further configured to connect different electrodes of two photovoltaic modules so that the two photovoltaic modules are connected in series.

Figure 7:
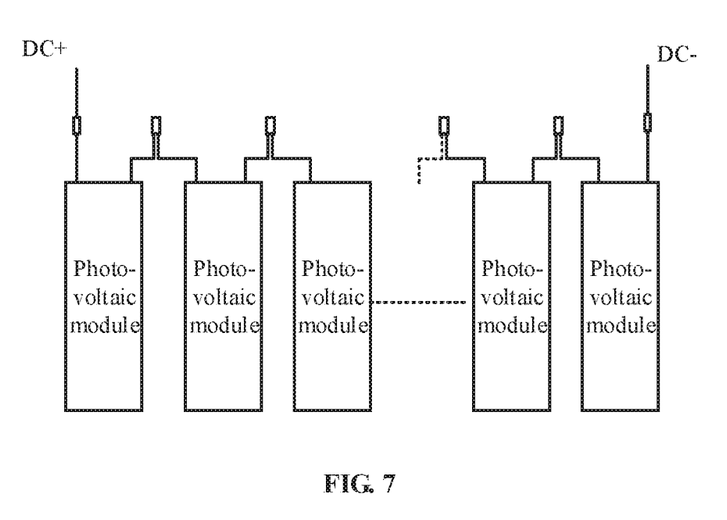
FIG. 7 is a schematic diagram showing an application of a wire connection terminal for a photovoltaic string according to another embodiment of the present disclosure.

In a specific application, the connection relationship between the wire connection terminal for the photovoltaic string and the photovoltaic module may be seen in FIG. 7. When the photovoltaic modules are connected in series via the wire connection terminal for the photovoltaic string and the positive and negative outputs of the photovoltaic string are connected to the direct current bus via the wire connection terminal for the photovoltaic string the operation principle of the wire connection terminal is the same as that described in the above embodiment, which is not described here.

When the fault of photovoltaic string is detected by the wire connection terminal for the photovoltaic string, the PCB 103 can disconnect an output of a string formed by multiple photovoltaic modules connected in series from the system in a timely manner, to prevent occurrence of significant danger, thereby meeting the requirements of some countries and regions.

The embodiments of the present disclosure are described in a progressive manner, with an emphasis placed on explaining the difference between each embodiment and other embodiments. The same or similar parts among the embodiments can be referred to each other. For the device disclosed in the embodiments, the corresponding descriptions are relatively simple because the apparatus correspond to the methods disclosed in the embodiments. For the relevant portions, one may be refer to the description of the method parts.

The above-described is merely preferred embodiments of the present disclosure and is not intended to define the present disclosure in any form. Preferred embodiments of the present disclosure are disclosed above, which should not be interpreted as limiting the present disclosure. Numerous alternations, modifications, and equivalents can be made to the technical solution of the present disclosure by those skilled in the art according to the methods and technical content disclosed herein without deviation from the scope of the technical solution of the present disclosure. Therefore, any alternations, equivalents and modifications made to the embodiments above according to the technical essential of the present disclosure without deviation from the content of the technical solution of the present disclosure should fall within the scope of protection of the present disclosure.

The invention claimed is:

1. A wire connection terminal for a photovoltaic string, wherein the wire connection terminal is arranged between a photovoltaic string and a direct current (DC) bus, the photovoltaic string comprises at least one photovoltaic module, and the wire connection terminal for the photovoltaic string comprises:
    a terminal connector configured to connect to a positive electrode or a negative electrode of the photovoltaic string;
    a fuse configured to connect the wire connection terminal to the DC bus and prevent the photovoltaic string from outputting an excessive current; and
    a printed circuit board (PCB) configured to sample an output current and an output voltage of the photovoltaic string, communicate with an inverter, and control the photovoltaic string to disconnect from the DC bus and output abnormal data for display when at least one of the output current and the output voltage of the photovoltaic string is abnormal or a system failure occurs.

2. The wire connection terminal for the photovoltaic string according to claim 1, wherein the PCB comprises:
    a current sampling circuit configured to sample the output current of the photovoltaic string;
    a voltage sampling circuit configured to sample the output voltage of the photovoltaic string; and
    a communication circuit configured to communicate with the inverter.

3. The wire connection terminal for the photovoltaic string according to claim 1, wherein the terminal connector is further configured to connect different electrodes of two photovoltaic modules, wherein the two photovoltaic modules are connected in series.

4. The wire connection terminal for the photovoltaic string according to claim 1, wherein the PCB comprises a processor.

5. The wire connection terminal for the photovoltaic string according to claim 4, wherein the PCB further comprises a power circuit configured to supply power for the current sampling circuit, the voltage sampling circuit and the communication circuit.

6. The wire connection terminal for the photovoltaic string according to claim 1, wherein the communication circuit is configured to communicate with the inverter via RS485, Programmable Logic Controller (PLC), Controller Area Network (CAN) or Wireless Fidelity (WiFi).

7. The wire connection terminal for the photovoltaic string according to claim 2, wherein the communication circuit is configured to communicate with the inverter directly or communicate with the inverter via a data collector.

8. The wire connection terminal for the photovoltaic string according to claim 7, wherein the communication circuit is configured to communicate with the inverter via the data collector and communicate with a monitoring platform via the data collector simultaneously.

* * * * *